Sept. 11, 1962 D. N. PETERSON 3,053,574
VEHICLE DUMPING BODY
Filed Feb. 24, 1961 2 Sheets-Sheet 1
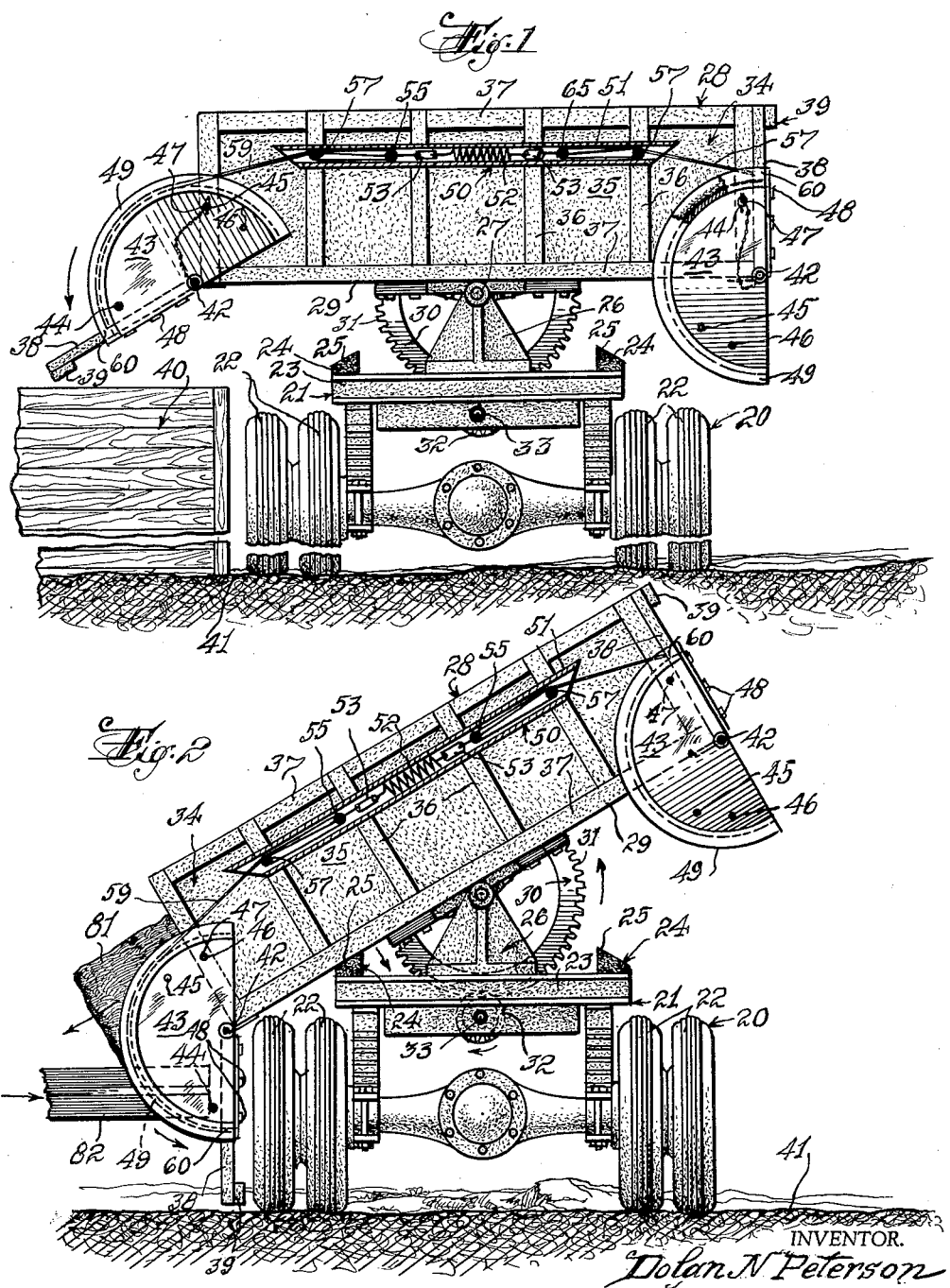
INVENTOR.
Dolan N Peterson
BY
Victor J. Evans & Co.
ATTORNEYS.

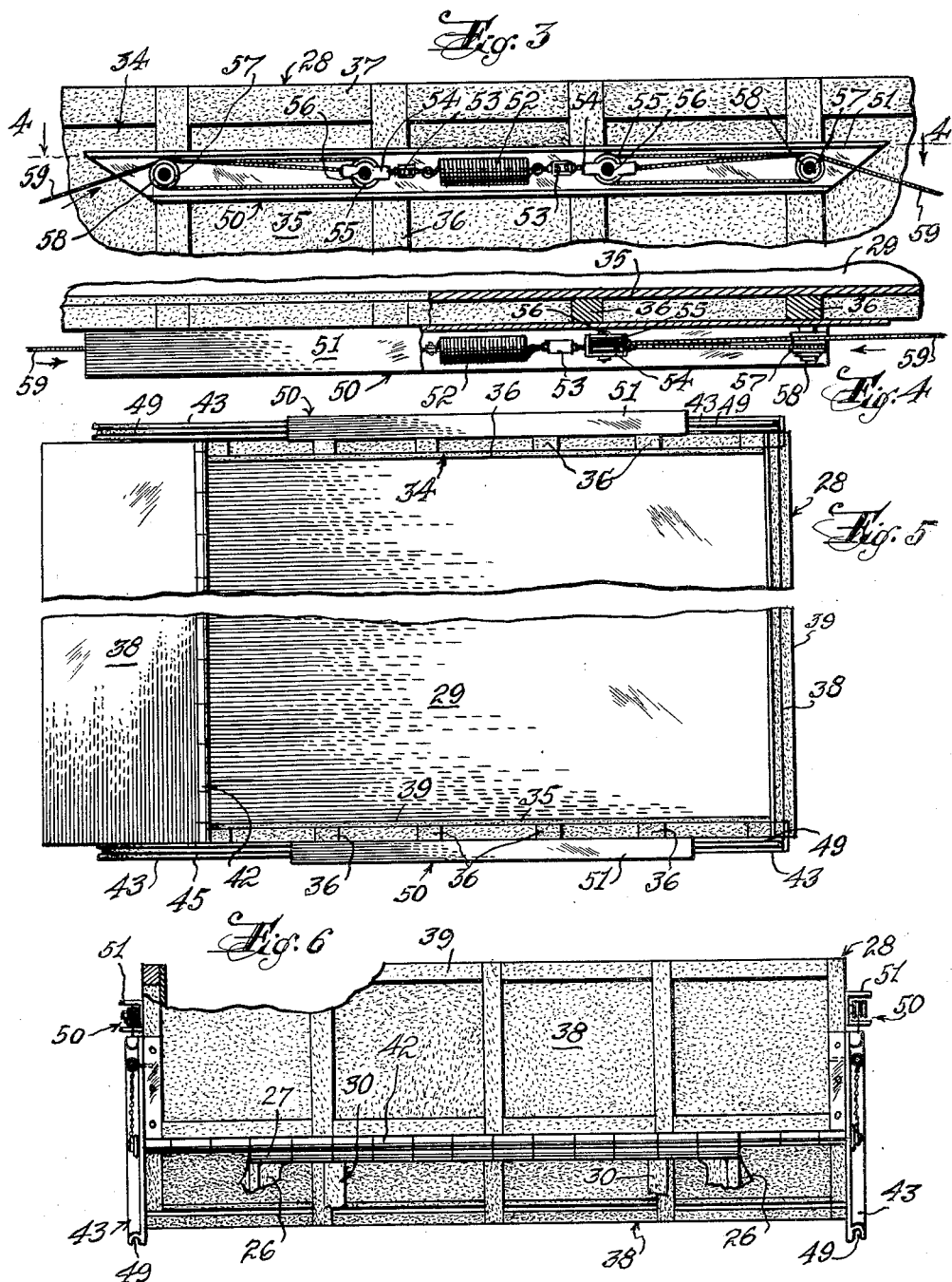

3,053,574
VEHICLE DUMPING BODY
Dolan N. Peterson, Rte. 1, Gering, Nebr.
Filed Feb. 24, 1961, Ser. No. 91,351
1 Claim. (Cl. 298—23)

The present invention relates to a vehicle such as a truck, and more particularly to an improved dumping body for such a vehicle.

An important object of the present invention is to provide a vehicle which includes a dumping body that can be tilted or pivoted to a desired position, and wherein the body is provided with a pair of opposed side gates or side boards which can be selectively opened or closed as desired.

Another object is to provide a means for permitting and controlling side gates or side boards of a mobile unit to be readily opened or closed so as to facilitate the loading or unloading of the body, and wherein the present invention is especially suitable for use in connection with farm work or other tasks of an agricultural nature.

Another object is to provide an apparatus of the character described which includes side gates as well as a control mechanism therefore and wherein the control mechanism may be manually operated or else the control mechanism may be operated by a hydraulic means, the present invention being adaptable for various purposes and uses such as for facilitating the raising and lowering of a beet box sides so as to facilitate the handling or loading or unloading of beets from a dump truck body or the like.

Another object is to provide an apparatus of the character described that may be utilized speedily and with precision by even inexperienced operators.

Further objects and advantages are to provide improved elements and arrangements thereof in a device of the character described that is economical to produce, durable in form, and conducive to the most economical use of materials and uniformity of members formed therefrom.

Still further objects and advantages will become apparent in the subsequent description in the specification.

In the drawings:

FIGURE 1 is a rear elevational view showing a truck having a tiltable body thereon and showing one phase of operation wherein the truck body is in a horizontal position and wherein one of the gates is open while the other gate is closed.

FIGURE 2 is a view similar to FIGURE 1 but showing the parts in a different position as for example when the truck body is tilted to an angle and wherein one gate is open and the other gate is closed.

FIGURE 3 is a fragmentary enlarged sectional view showing a portion of the control mechanism for the gates.

FIGURE 4 is a sectional view taken on the line 4—4 of FIGURE 3.

FIGURE 5 is a top plan view of the present invention showing the parts in the position of FIGURE 1 with one gate open and one gate closed.

FIGURE 6 is a fragmentary side elevational view with the parts in the position of FIGURE 1.

Referring in detail to the drawings and more particularly to FIGURES 1 through 6 of the drawings, the numeral 20 indicates a vehicle such as a truck which includes a mobile chassis that is indicated generally by the numeral 21, and the wheels for the vehicle 20 are indicated by the numeral 22, and the chassis 21 may include a horizontally disposed frame portion 23 that has yieldable or resilient bumpers or shock absorbers 24 secured thereto, and the members 24 have inclined upper surfaces 25 as for example as shown in FIGURE 1.

The numeral 26 indicates base pieces which are suitably secured to the frame portion 23 of the chassis 21, and a horizontally disposed pivot pin or rod 27 is supported by the base pieces 26. The numeral 28 indicates a tiltable body member or body which is suitably affixed to the rod 27 so that for example the body member 28 can be tilted from a horizontal position such as that shown in FIGURE 1 to a tilted position such as that shown in FIGURE 2, or the body member 28 can be tilted to other angular positions about an axis extending through the rod 27 as described hereinafter. The body member or body portion 28 of the vehicle is provided with a bottom wall or bottom portion 29, FIGURE 5, and the plurality of arcuate or semi-circular racks 30 are suitably affixed to the under surface of the body member 28, as for example as shown in FIGURE 2. Each of the racks 30 is provided with teeth 31, and the teeth 31 mesh with gear members or worms 32 which are suitably affixed on a shaft 33, and the shaft 33 can be driven by any suitable means as for example the shaft 33 can be driven from the vehicle power take off or from a suitable drive connection from the vehicle engine.

The body member 28 includes spaced parallel vertically disposed bulk heads or front and rear end walls 34 which are fixedly connected to the bottomwall 29, and each of the front and back end walls 34 is adapted to include a vertically disposed main body portion 35, and these end walls may also include spaced parallel vertically disposed uprights 36 as well as horizontally disposed crosspieces 37.

There is further provided for the body member 28 a pair of gates 38 that are hingedly mounted at the sides of the body member, and counter weights or bars 39 are secured or formed integral with the gates 38 as shown in the drawings. In FIGURE 1 the numeral 40 indicates a bin or receptacle which may receive material that is being unloaded or dumped from the truck body 28, and the bin 40 may conveniently sit on the ground 41 whereby with the gates 38 shown in the left side of FIGURE 1 in opened position, unloading of the truck body 28 into the bin 40 will be facilitated. The gates 38 are adapted to be hingedly connected to the body member 28 by means of the hinge mechanism 42.

Arranged at each end of each gate 38 is a semi-circular plate member 43, and the plate members 43 are adapted to be provided with apertured openings 44, 45, and 46 whereby a suitable member such as a locking pin 47 can be selectively extended through certain of these openings and into engagement with registering openings or apertures in the body member 28 so as to provide a positive lock for retaining the gate 38 stationary or immobile in its adjusted position. The plate members 43 may be suitably affixed or secured to the gates 38 as at 48.

Each of the plate members 43 is provided with an arcuate grooved portion 49.

There is further provided for each pair of gates 38 a control mechanism which is indicated generally by the numeral 50, so that for example one of the control members 50 may be arranged adjacent the front of the body member 28, while a similar control mechanism 50 is arranged in the rear of the body member 28 and since each of the control mechanisms 50 has the same general construction and operation, it is thought that a description of one will suffice for both. As shown in the drawings each of the control mechanisms 50 embodies a channel member 51 which is suitably secured to an end wall 34, and arranged intermediate the ends of the channel member 51 is a floating spring member 52, there being a pair of adjustable turn buckles 53 connected to the ends of the spring member 52. Support members 54 are connected to the turn buckles 53, and pulley members 55 are mounted in each support member 54 as for example by means of a pin or axle 56. The numeral 57 designates each of a pair of pulley members which are journaled in the end portions of the channel member 51 as at 58, and the cables 59 are arranged as shown in the drawings. For each control mechanism 50 there is a pair of the cables 59, and the pulley members 58 are provided with double grooved sections therein, while the pulley wheels 55 may consist of a single grooved section. Each cable 59 is adapted to be arranged so that one end thereof is anchored as at 60 to a plate member 43, and a portion of the cable 59 is arranged in engagement with the grooved sections or portions 49 of the plate members 43, and the cable 59 is such that a portion thereof is trained around or arranged in engagement with one of the pair of grooves of each pulley member 57, and the cable is also arranged in engagement with the pulley wheels 55 and the cable is then arranged in engagement with the other grooved sections of the pulley members 57 and an end of the cable 59 is anchored or suitably affixed to a corresponding support member 54.

The body member 28 is tiltable about an axis extending through the shaft or rod 27, and in order to tilt or rock the body member 28 to the desired position as for example from the position shown in FIGURE 1 to the position shown in FIGURE 2 or vice-versa, the shaft 33 can be operated from a suitable power source such as from the vehicle power take off shaft, and as the shaft 33 is rotated, the worms or gears 32 will be rotated, and since the worms 32 mesh with the teeth 31 of the racks 30, it will be seen that this rotation of the shaft 33 will result in movement or rotation of the racks 30. The racks 30 are suitably secured to the under surface of the body member 28 so that this movement of the racks 30 will result in corresponding movement of the body member 28 whereby the body member can be rocked or tilted on its pivot pin 27, and suitable controls can be provided whereby for example the driver of the truck sitting in the cab of the vehicle can accurately position the body member 28 at the desired location. Thus, when the vehicle is being driven along a highway, or other surface, the body member 28 may be arranged in a horizontal position as shown in FIGURE 1, and when articles such as articles 81 are being unloaded from the body member 28, as for example onto a trailer or the like as indicated by the numeral 82, the body member 28 can be in an inclined position so as to facilitate the loading or unloading of the body member.

When a particular gate is to be opened, assuming that the same is initially in closed position as for example as shown in the right side of FIGURE 1, the retaining pin 47 is first disengaged from its registering openings and then the individual using the vehicle or person working therewith is adapted to manually grip a convenient portion of a gate and then the gate 38 can be pivoted on its hinge 42 as for example the gate 38 can be pivoted from a closed position to an opened position, and as the gate is moved opened, the cable 59 will be pulled on, and the grooved portion 49 of the plate member 43 functions as a guide for the adjacent portion of the cable 59, and in addition the plate members 43 function as retaining members so as to help prevent grain or the like which may be in the process of being unloaded from the dump truck 28 from accidentally or inadvertently falling off the ends of the gate. As this tension is applied to the cable 59, the provision of the pulley 57 and 55 and the turn buckles 53 will further insure that the pressure or tension will be applied to the spring 52 so that the spring 52 can function as a return spring to help close the gates after the body member has been loaded or unloaded with the desired materials. The counter weight or bar 39 helps offset the return pull exerted by the spring 52, and the counter weight 39 is also adapted to be used for preventing the gate 39 from snapping back too quickly and slamming or banging against the side of the body member 28. Also, by adjusting the turn buckle assemblies 53 the closing action of the gate can be regulated or varied in order to permit the same to open or close with the desired amount of action.

Although the invention has been herein shown and described in what is conceived to be the most practical and preferred embodiment, it is recognized that the departures may be made therefrom within the scope of the invention, which is not to be limited to the details disclosed herein but is to be accorded the full scope of the claims so as to embrace any and all equivalent devices and apparatus.

Having described my invention, what I claim as new and desired to secure by Letters Patent is:

In a dump body for a vehicle including a bottom, opposed end walls rising from said bottom, and a gate normally extending over each of the adjacent ends of said end walls, said gates having their lower edges hingedly connected to said bottom for swinging movement of said gates outwardly of said end walls, a vertically disposed semi-circular plate member disposed exteriorly of the portion of at least one of said end walls contiguous to the adjacent gate and having the upper part adjacent the straight edge thereof fixedly secured to said gate for movement therewith, said plate member when said gate is swung outwardly serving to close the space between said gate and said one end wall, said plate member being provided on the periphery thereof with a groove, a cable having one end fixed to said plate member and having the portion adjacent said one end receivable in said groove upon execution of outward swinging movement of said gate, and a spring operatively connected to said one end wall and to the other end of said cable, said spring being put under tension upon execution of outward swinging movement of said gate and being operable to bias said gate to the normal position.

References Cited in the file of this patent
UNITED STATES PATENTS

| | | |
|---|---|---|
| 1,154,446 | Skidmore | Sept. 21, 1915 |
| 1,413,946 | Stebbins | Apr. 25, 1922 |
| 1,909,341 | Galanot | May 16, 1933 |